United States Patent
Kim et al.

(10) Patent No.: US 11,595,892 B2
(45) Date of Patent: Feb. 28, 2023

(54) METHOD AND APPARATUS FOR RECONFIGURING TERMINAL BASED ON STATE OF TERMINAL IN WIRELESS COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR); Suyoung Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 139 days.

(21) Appl. No.: 16/994,094

(22) Filed: Aug. 14, 2020

(65) Prior Publication Data
US 2021/0051585 A1 Feb. 18, 2021

(30) Foreign Application Priority Data

Aug. 14, 2019 (KR) .................. 10-2019-0099840

(51) Int. Cl.
*H04W 52/02* (2009.01)
*H04W 8/22* (2009.01)
(Continued)

(52) U.S. Cl.
CPC ...... *H04W 52/0216* (2013.01); *H04B 7/0452* (2013.01); *H04W 8/22* (2013.01); *H04W 76/28* (2018.02)

(58) Field of Classification Search
CPC ... H04W 52/0216; H04W 8/22; H04W 76/28; H04W 8/24; H04W 72/048;
(Continued)

(56) References Cited

U.S. PATENT DOCUMENTS 10,736,079 B2 8/2020 Jang et al.
2016/0212709 A1* 7/2016 Park .................. H04W 52/0251
(Continued)

FOREIGN PATENT DOCUMENTS

KR 10-1859591 5/2018

*Primary Examiner* — Walli Z Butt
(74) *Attorney, Agent, or Firm* — The Farrell Law Firm, P.C.

(57) ABSTRACT

A method and apparatus are provided for reconfiguration of a terminal in a wireless communication system. The method includes transmitting, to a BS, capability information including information associated with the terminal overheating and/or information associated with the terminal power consumption, receiving, from the BS, first configuration information including overheating assistance configuration information and/or preference configuration information for power saving, based on the transmitted capability information, identifying, based on the first configuration information, a triggering event for reporting assistance information including a triggering event for mitigating overheating and/or a triggering event for power saving, determining the assistance information corresponding to the identified triggering event, the assistance information including a preferred number of carriers assistance information, preferred bandwidth assistance information, a preferred number of MIMO layers assistance information, and/or DRX preference information, transmitting, to the BS, the determined assistance information, and receiving second configuration information generated based on the transmitted assistance information.

17 Claims, 10 Drawing Sheets

(51) Int. Cl.
*H04W 76/28* (2018.01)
*H04B 7/0452* (2017.01)

(58) Field of Classification Search
CPC .......... H04W 52/0212; H04W 72/0413; H04B 7/0452; H04B 7/0413; Y02D 30/70
See application file for complete search history.

(56) References Cited

U.S. PATENT DOCUMENTS

| | | | |
|---|---|---|---|
| 2020/0053763 A1* | 2/2020 | Ljung | H04L 5/0053 |
| 2020/0229085 A1* | 7/2020 | Hsu | H04W 52/0209 |
| 2021/0051592 A1* | 2/2021 | Wang | H04L 5/001 |
| 2022/0124697 A1* | 4/2022 | Yao | H04W 72/0406 |

* cited by examiner

METHOD AND APPARATUS FOR RECONFIGURING TERMINAL BASED ON STATE OF TERMINAL IN WIRELESS COMMUNICATION SYSTEM

CROSS-REFERENCE TO RELATED APPLICATION(S)

This application is based on and claims priority under 35 U.S.C. § 119 to Korean Patent Application No. 10-2019-0099840, filed on Aug. 14, 2019, in the Korean Intellectual Property Office, the entire disclosure of which is incorporated herein by reference.

BACKGROUND

1. Field

The disclosure relates generally to a method and apparatus for reconfiguring a terminal based on a state of the terminal in a wireless communication system.

2. Description of Related Art

To meet the increasing demand with respect to wireless data traffic since the commercialization of $4^{th}$ generation (4G) communication systems, considerable efforts have been made to develop improved $5^{th}$ generation (5G) communication systems or pre-5G communication systems. '5G communication systems' or 'pre-5G communication systems' may also be called 'beyond 4G network communication systems' or 'post Long-Term Evolution (LTE) systems.'

In order to achieve a high data transmission rate, 5G communication systems are being developed to operate in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, such as beamforming, massive multiple-input multiple-output (MIMO), full dimensional MIMO (FD-MIMO), array antennas, analog beam-forming, and large-scale antennas.

In order to improve system networks for 5G communication systems, various technologies have been developed, e.g., evolved small cells, advanced small cells, cloud radio access networks (RAN), ultra-dense networks, device-to-device communication (D2D), wireless backhaul, moving networks, cooperative communication, coordinated multi-points (CoMP), and interference cancellation.

In addition, hybrid frequency shift keying and quadrature amplitude modulation (FQAM) and sliding window super-position coding (SWSC), which are advanced coding modulation (ACM) methods, and filter bank multi carrier (FBMC), non-orthogonal multiple access (NOMA), and sparse code multiple access (SCMA), which are advanced access techniques, have been developed in the 5G communication systems.

The Internet has evolved from a human-based connection network, where humans create and consume information, to the Internet of Things (IoT), where distributed configurations, such as objects, exchange information with each other to process the information. Internet of Everything (IoE) technology is also emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc., have been studied. In an IoT environment, intelligent information technology (IT) services may be provided to collect and analyze data obtained from objects connected to each other. As existing IT techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud-RAN as a big data processing technology described above may be an example of convergence of 5G communication technology and IoT technology.

As it is possible to provide various services according to the above-mentioned features and the development of a mobile communication system, there is a demand for, in particular, a method by which a user equipment (UE) can efficiently mitigate heat generation and reduce power consumption.

SUMMARY

Accordingly, as aspect of the disclosure is to provide a method and apparatus for reconfiguring a terminal based on a state of the terminal in a wireless communication system.

Additional aspects will be set forth in part in the description which follows and, in part, will be apparent from the description, or may be learned by practice of the presented embodiments of the disclosure.

In accordance with an aspect of the disclosure, a method, performed by a terminal, is provided for reconfiguration in a wireless communication system. The method includes transmitting, to a base station (BS), capability information including at least one of information associated with overheating of the terminal or information associated with power consumption of the terminal, receiving, from the BS, first configuration information including at least one of overheating assistance configuration information or preference configuration information for power saving, based on the transmitted capability information, identifying, based on the first configuration information, a triggering event for reporting assistance information including at least one of a triggering event for mitigating overheating or a triggering event for power saving, determining the assistance information corresponding to the identified triggering event, the assistance information including at least one of a preferred number of carriers assistance information, preferred bandwidth assistance information, a preferred number of multiple input multiple output (MIMO) layers assistance information, or discontinuous reception (DRX) preference information, transmitting, to the BS, the determined assistance information; and receiving second configuration information generated based on the transmitted assistance information.

When the identified triggering event for reporting the assistance information is the triggering event for mitigating overheating, at least one of the preferred number of carriers assistance information, the preferred bandwidth assistance information, or the preferred number of MIMO layers assistance information may be added to overheating assistance information and then transmitted.

When the identified triggering event for reporting the assistance information is the triggering event for power saving, the at least one of the preferred number of carriers assistance information, the preferred bandwidth assistance information, the preferred number of MIMO layers assistance information, or the DRX preference information may be added to preference information associated with the power saving and then transmitted.

When the identified triggering event for reporting the assistance information is both for mitigating overheating and for power saving, at least one of information associated with the preferred number of carriers assistance information for power saving, preferred bandwidth assistance information for power saving, a preferred number of MIMO layers assistance information for power saving, or DRX preference information for power saving may be transmitted with overheating assistance information including at least one of the preferred number of carriers assistance information for mitigating overheating, the preferred bandwidth assistance information for mitigating overheating, or the preferred number of MIMO layers assistance information for mitigating overheating.

The DRX preference information may include at least one of information on a DRX inactivity timer length for power saving or information on a long DRX cycle length for power saving.

The preference configuration for power saving may include prohibit timer information including at least one of prohibit timer information for reporting DRX preference information, prohibit timer information for reporting the preferred bandwidth assistance information, prohibit timer information for reporting the preferred number of carriers assistance information, or prohibit timer information for reporting the preferred number of MIMO layers assistance information.

The method may further include, when the assistance information is transmitted for power saving, controlling a prohibit timer to start based on the prohibit timer information for prohibiting another assistance information of the terminal from being transmitted while the prohibit timer corresponding to the transmitted assistance information is running.

In accordance with another aspect of the disclosure, a terminal is provided for reconfiguration in a wireless communication system. The terminal includes a transceiver, and a processor coupled with the transceiver and configured to transmit, to a base station (BS), capability information including at least one of information associated with overheating of the terminal or information associated with power consumption of the terminal, receive, from the BS, first configuration information including at least one of overheating assistance configuration information or preference configuration information for power saving, based on the transmitted capability information, identify, based on the first configuration information, a triggering event for reporting assistance information including at least one of a triggering event for mitigating overheating or a triggering event for power saving, determine the assistance information corresponding to the identified triggering event, the assistance information including at least one of a preferred number of carriers assistance information, preferred bandwidth assistance information, a preferred number of multiple input multiple output (MIMO) layers assistance information, or discontinuous reception (DRX) preference information, transmit, to the BS, the determined assistance information, and receive, from the BS, second configuration information generated based on the transmitted assistance information.

When the identified triggering event for reporting the assistance information is the triggering event for mitigating overheating, at least one of the preferred number of carriers assistance information, the preferred bandwidth assistance information, or the preferred number of MIMO layers assistance information may be added to overheating assistance information and then transmitted.

When the identified triggering event for reporting the assistance information is the triggering event for power saving, the at least one of the preferred number of carriers assistance information, the preferred bandwidth assistance information, the preferred number of MIMO layers assistance information, or the DRX preference information may be added to preference information associated with the power saving and then transmitted.

When the identified triggering event for reporting the assistance information is both for mitigating overheating and for power saving, at least one of information associated with the preferred number of carriers assistance information for power saving, preferred bandwidth assistance information for power saving, a preferred number of MIMO layers assistance information for power saving, or DRX preference information for power saving may be transmitted with overheating assistance information including at least one of the preferred number of carriers assistance information for mitigating overheating, the preferred bandwidth assistance information for mitigating overheating, or the preferred number of MIMO layers assistance information for mitigating overheating.

The DRX preference information may include at least one of information on a DRX inactivity timer length for power saving or information on a long DRX cycle length for power saving.

The preference configuration for power saving may include prohibit timer information including at least one of prohibit timer information for reporting DRX preference information, prohibit timer information for reporting the preferred bandwidth assistance information, prohibit timer information for reporting the preferred number of carriers assistance information, or prohibit timer information for reporting the preferred number of MIMO layers assistance information.

The method may further include, when the assistance information is transmitted for power saving, controlling a prohibit timer to start based on the prohibit timer information for prohibiting another assistance information of the terminal from being transmitted while the prohibit timer corresponding to the transmitted assistance information is running.

In accordance with another aspect of the disclosure, a method, performed by a BS, is provided for reconfiguring a terminal in a wireless communication system. The method includes receiving, from the terminal, capability information including at least one of information associated with overheating of the terminal or information associated with power consumption of the terminal; transmitting, to the terminal, first configuration information including at least one of overheating assistance configuration information or preference configuration information for power saving, based on the received capability information; receiving, from the terminal, assistance information including at least one of a preferred number of carriers assistance information, preferred bandwidth assistance information, a preferred number of multiple input multiple output (MIMO) layers assistance information, or discontinuous reception (DRX) preference information, based on a triggering event identified by the terminal, the triggering event including at least one of a triggering event for mitigating overheating or a triggering event for power saving; generating second configuration information corresponding to the triggering event, based on the assistance information; and transmitting, to the terminal, the generated second configuration information corresponding to the triggering event.

When the identified triggering event is for reporting the assistance information and corresponds to the triggering event for power saving, the at least one of the preferred number of carriers assistance information, the preferred bandwidth assistance information, the preferred number of MIMO layers assistance information, or the DRX preference information may be added to preference information associated with the power saving and then transmitted.

When the identified triggering event is for reporting the assistance information and corresponds to both the triggering event for mitigating overheating and the triggering event for power saving, at least one of information associated with the preferred number of carriers assistance information for power saving, preferred bandwidth assistance information for power saving, a preferred number of MIMO layers assistance information for power saving, or DRX preference information for power saving may be transmitted with overheating assistance information including at least one of the preferred number of carriers assistance information for mitigating overheating, the preferred bandwidth assistance information for mitigating overheating, or the preferred number of MIMO layers assistance information for mitigating overheating.

The DRX preference information may include at least one of information on a DRX inactivity timer length for power saving or information on a long DRX cycle length for power saving.

The preference configuration information for power saving may include prohibit timer information including at least one of prohibit timer information for reporting DRX preference information, prohibit timer information for reporting the preferred bandwidth assistance information, prohibit timer information for reporting the preferred number of carriers assistance information, or prohibit timer information for reporting the preferred number of MIMO layers assistance information.

In accordance with another aspect of the disclosure, a BS is provided for reconfiguring a terminal in a wireless communication system. The BS includes a transceiver, and a processor coupled with the transceiver and configured to receive, from the terminal, capability information including at least one of information associated with overheating of the terminal or information associated with power consumption of the terminal; transmit, to the terminal, first configuration information including at least one of overheating assistance configuration information or preference configuration information for power saving, based on the received capability information; receive, from the terminal, assistance information including at least one of a preferred number of carriers assistance information, preferred bandwidth assistance information, a preferred number of multiple input multiple output (MIMO) layers assistance information, or discontinuous reception (DRX) preference information, based on a triggering event identified by the terminal, the triggering event including at least one of a triggering event for mitigating overheating or a triggering event for power saving; generate second configuration information corresponding to the triggering event, based on the assistance information; and transmit, to the terminal, the generated second configuration information corresponding to the triggering event.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
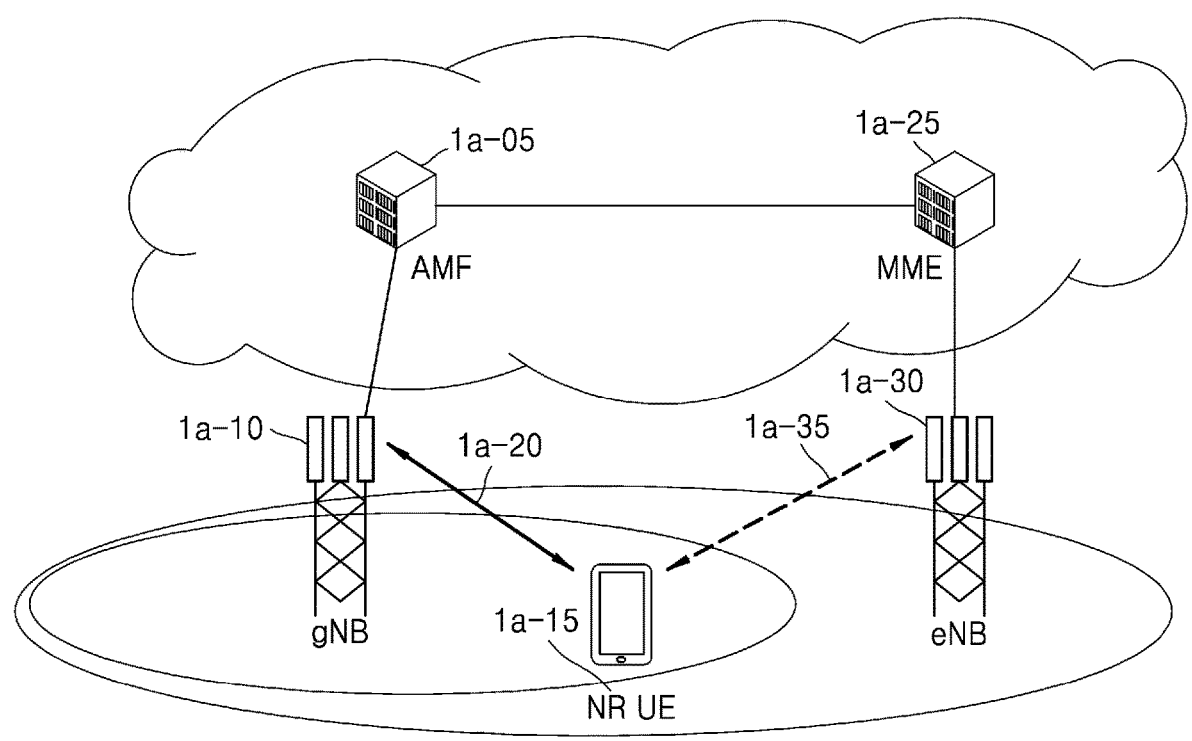
FIG. 1A illustrates a next-generation mobile communication system, according to an embodiment.

Hereinafter, various embodiments of the disclosure will be described with reference to accompanying drawings.

In describing the embodiments of the disclosure, descriptions of technical contents that are well known in the technical field to which the disclosure belongs and are not directly related to the disclosure will be omitted to avoid obscuring the subject matter of the disclosure.

Additionally, components may be exaggerated, omitted, or schematically illustrated in drawings for clarity. As such, the size of each component does not completely reflect the actual size. In the drawings, like reference numerals may denote like elements.

The embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims.

Herein, combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). In some alternative implementations, functions mentioned in blocks may occur out of order. For example, two blocks illustrated successively may actually be executed substantially concurrently, or the blocks may sometimes be performed in a reverse order according to the corresponding function.

Herein, the term "unit" may refer to a software component or hardware component such as a field-programmable gate array (FPGA) or an application-specific integrated circuit (ASIC), and performs a specific function. However, the term "unit" is not limited to software or hardware. A "unit" may be formed to be in an addressable storage medium, or may be formed to operate one or more processors. Thus, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Further, the components and "units" may be embodied to reproduce one or more central processing units (CPUs) in a device or security multimedia card. Also, in the embodiments of the disclosure, the "unit" may include at least one processor.

Throughout the disclosure, the expression "at least one of a, b or c" indicates only a, only b, only c, both a and b, both a and c, both b and c, all of a, b, and c, or variations thereof.

Herein, a controller may also be referred to as a processor.

Throughout the specification, a layer (or a layer apparatus) may also be referred to as an entity.

Herein, a BS is an entity that assigns resources of a terminal, and may include a gNode B (gNB), an eNode B (eNB), a Node B (NB), a wireless access unit, a BS controller, or a node on a network. Examples of a terminal may include a UE, a mobile station (MS), a cellular phone, a smartphone, a computer, and a multimedia system capable of performing a communication function. However, the disclosure is not limited to the above examples.

Hereinafter, a technique for a terminal to receive broadcast information from a BS in a wireless communication system will be described. The disclosure relates to a communication technique and system in which a 5G communication system for supporting a higher data rate than a beyond 4G communication system is converted to an IoT technology. The disclosure may be applied to intelligent services (e.g., smart homes, smart buildings, smart cities, smart cars or connected cars, health care, digital education, retail business, and security and safety related services) based on 5G communication technology and IoT related technology.

Terms indicating broadcast information, terms indicating control information, terms related to communication coverage, terms indicating a change in a state (e.g., an event), terms indicating network entities, terms indicating messages, and terms indicating components of an apparatus are exemplified for convenience of description. Thus, the terms used in the disclosure are not limited and other terms having the same technical meanings may be used.

For convenience of description, some of terms and names defined by the 3rd Generation Partnership Project Long Term Evolution (3GPP LTE) standard may be used. However, the disclosure is not limited by such terms and names, and may be equally applied to systems conforming to other standards.

Wireless communication systems have been developed from wireless communication systems providing voice centered services in the early stage toward broadband wireless communication systems providing high-speed, high-quality packet data services, like communication standards of high speed packet access (HSPA), LTE or evolved universal terrestrial radio access (E-UTRA), LTE-advanced (LTE-A), and LTE-Pro of the 3GPP, high rate packet data (HRPD) and ultra mobile broadband (UMB) of 3GPP2, IEEE 802.16e, etc.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a UE or a mobile station (MS)) transmits data or a control signal to a BS, and the DL refers to a radio link through which a BS transmits data or a control signal to a terminal. The multiple access scheme, as described above, normally allocates and operates time-frequency resources including data or control information to be transmitted to each other to prevent the time-frequency resources from overlapping with each other, i.e., establish orthogonality, thereby dividing the data or the control information of each user.

As a future communication system after the LTE system, such as a 5G communication system, should be able to freely reflect various requirements of a user and a service provider, services satisfying various requirements need to be supported. The services considered for the 5G communication system include enhanced mobile broadband (eMBB), massive machine type communication (mMTC), ultra reliability low latency communication (URLLC), etc.

eMBB is intended to provide a higher data rate than a data rate supported by the LTE, LTE-A, or LTE-Pro system. For example, in a 5G communication system, eMBB should be able to provide a peak data rate of 20 Gbps in the DL and a peak data rate of 10 Gbps in the UL from the viewpoint of one BS. eMBB should also provide an increased user perceived data rate. In order to satisfy such requirements, improvement of various transmitting/receiving technologies including a further improved MIMO transmission technology may be demanded. Also, a data rate can be required in the 5G communication system by using a frequency bandwidth wider than 20 MHz in a frequency band of 3 to 6 GHz or equal to or greater than 6 GHz instead of 2 GHz used by current LTE.

mMTC is intended to support application services such as Internet of things in the 5G communication system. mMTC is used for an access support of a large-scale terminal in a cell, coverage enhancement of a terminal, improved battery time, and cost reduction of a terminal in order to efficiently provide the IoT. The IoT should be able to support a large number of terminals (e.g., 1,000,000 terminals/km$^2$) in a cell because it is attached to various sensors and various devices to provide communication functions. In addition, the terminals supporting mMTC are more likely to be positioned in shaded areas not covered by a cell, such as the underground of a building due to nature of services, and thus, the terminal may require a wider coverage than other services provided by the 5G communication system. The terminals that support mMTC should be configured as inexpensive terminals and have very long battery lifetime because it is difficult to frequently replace batteries of the terminals.

URLLC that is a cellular-based wireless communication service used for mission-critical purposes should provide communication providing ultra-low latency and ultra-high reliability as a service used in remote control for robots or machinery, industrial automation, unmanaged aerial vehicles, remote health care, or emergency alert. For example, a service supporting URLLC should satisfy air interface latency smaller than 0.5 milliseconds and at the same time, has a packet error rate of $10^{-5}$ or less. Accordingly, for the service supporting URLLC, the 5G communication system should provide a transmit time interval (TTI) shorter than those for other services while allocating a broad resource in a frequency band. However, the mMTC, URLLC, and eMBB are examples of different service types, and service types to which the disclosure is applied are not limited thereto.

The services considered in the 5G communication system described above may be converted with each other and provided based on one framework. That is, for efficient resource management and control, services may be integrated, controlled, and transmitted via one system instead of being independently operated.

Although one or more embodiments of the disclosure will be described as an example of an LTE, LTE-A, LTE Pro, or NR system, the one or more embodiments of the disclosure may also be applied to other communication systems having a similar technical background or channel form. Accordingly, the disclosure may be applied to other communication systems through some modifications without departing from the scope of the disclosure. Hereinafter, frame structures of LTE, LTE-A, and 5G communication systems will be described with reference to accompanying drawings, and a design direction of the 5G communication system will be described.

FIG. 1A illustrates a next-generation mobile communication system, according to an embodiment of the disclosure.

Referring to FIG. 1A, a RAN of the next-generation mobile communication system (e.g., a new radio (NR) system) includes an NR node B (NR NB) (or a gNB) 1a-10 and an access and mobility management function (AMF) 1a-05 (a new radio core network). An NR UE 1a-15 may access an external network via the gNB 1a-10 and the AMF 1a-05. The NR UE 1a-15 may also be referred to as a UE.

In FIG. 1A, the gNB 1a-10 may correspond to an evolved node B (eNB) of an existing LTE system. The gNB 1a-10 is connected to the NR UE 1a-15 through radio channels and may provide better services than an existing NodeB. Because all user traffic data is serviced through shared channels in the next-generation mobile communication system, an entity for collating buffer status information of UEs, available transmission power status information, channel status information, etc., and performing scheduling is required and such operations may be performed by the gNB 1a-10. A single gNB 1a-10 may control multiple cells. The next-generation mobile communication system may have a bandwidth greater than the maximum bandwidth of the existing LTE system in order to achieve an ultrahigh data rate, and may be grafted onto a beamforming technology by using OFDM as a radio access technology. Adaptive modulation and coding (AMC) may be used to determine a modulation scheme and a channel coding rate in accordance with a channel status of the NR UE 1a-15. The AMF 1a-05 may perform functions such as mobility support, bearer configuration, and quality of service (QoS) configuration. The AMF 1a-05 is an entity for performing a mobility management function and various control functions for the NR UE 1a-15 and may be connected to multiple gNBs 1a-10. The next generation mobile communication system may cooperate with the existing LTE system, and the AMF 1a-05 may be connected to a mobility management entity (MME) 1a-25 through a network interface. The MME 1a-25 may be connected to an eNB 1a-30 that is an existing BS. The NR UE 1a-15 supporting LTE-NR dual connectivity may transmit and receive data while maintaining a connection to the eNB 1a-30, in operation 1a-35, in addition with the gNB 1a-10.

Figure 1B:
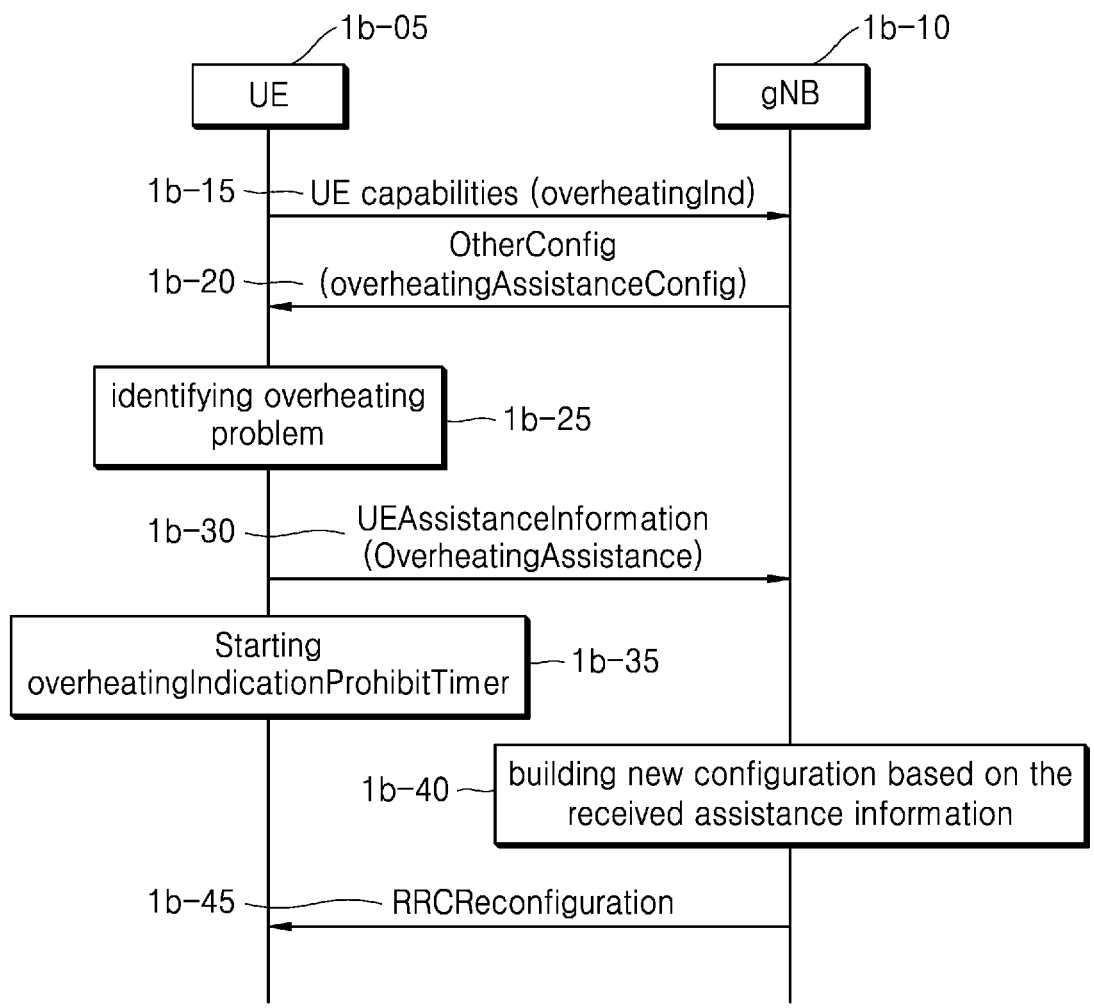
FIG. 1B is a signal flow diagram illustrating a process in which a UE reports certain information to a next generation Node B (gNB) to mitigate overheating of the UE in a next-generation mobile communication system, according to an embodiment.

FIG. 1B is a signal flow diagram illustrating a process in which a UE reports information to a gNB to mitigate overheating of the UE in a next-generation mobile communication system, according to an embodiment.

A terminal may be overheated during an operation, such as a data transmitting and receiving process, an image reproducing process, or an application executing process. Thus, in order to mitigate heat generation in the terminal, a BS may reconfigure the terminal. According to an embodiment of the disclosure, the terminal may notify the BS that an operation for mitigating the heat generation in the terminal is being performed. In a next-generation mobile communication system, a process in which the terminal reports certain information, e.g., reconfiguration information preferred by the terminal to suppress overheating, to the BS has been introduced to mitigate the heat generation in the terminal.

Referring to FIG. 1B, in step 1b-15, a UE 1b-05 reports to a gNB 1b-10 that the UE 1b-05 has a capability to report information for mitigating heat generation in the UE 1b-05.

In step 1b-20, the gNB 1b-10 configures the UE 1b-05 to report the information for mitigating the heat generation in the UE 1b-05 to the gNB 1b-10, via an overheatingAssistanceConfig information element (IE). The overheatingAssistanceConfig IE includes an overheatingIndicationProhibitTimer value as a value of one prohibit timer. The prohibit timer identifies overheating in the UE 1b-05 in step 1b-25 and is started in step 1b-35 when the information for mitigating the heat generation in the UE 1b-05 is reported to the gNB 1b-10 in step 1b-30.

While the prohibit timer is running, the UE 1b-05 is unable to report the information for mitigating the heat generation in the UE 1b-05 again to the gNB 1b-10. Accordingly, excessive signaling overhead caused by frequent report triggering may be prevented. The information for mitigating the heat generation in the UE 1b-05 is included in an overheatingAssistance IE and is transmitted to the gNB 1b-10 via an UEAssistanceInformation message that is one RRC message.

In the TS38.331 Standard, the overheatingAssistance IE is as follows.

```
OverheatingAssistance ::=              SEQUENCE {
    reducedMaxCCs                          SEQUENCE {
        reducedCCsDL                           INTEGER (0..31),
        reducedCCsUL                           INTEGER (0..31)
    } OPTIONAL,
    reducedMaxBW-FR1                       SEQUENCE {
        reducedBW-FR1-DL                       ReducedAggregatedBandwidth,
        reducedBW-FR1-UL                       ReducedAggregatedBandwidth
    } OPTIONAL,
    reducedMaxBW-FR2                       SEQUENCE {
        reducedBW-FR2-DL                       ReducedAggregatedBandwidth,
        reducedBW-FR2-UL                       ReducedAggregatedBandwidth
    } OPTIONAL,
    reducedMaxMIMO-LayersFR1               SEQUENCE {
        reducedMIMO-LayersFR1-DL               MIMO-LayersDL,
        reducedMIMO-LayersFR1-UL               MIMO-LayersUL
    } OPTIONAL,
    reducedMaxMIMO-LayersFR2               SEQUENCE {
        reducedMIMO-LayersFR2-DL               MIMO-LayersDL,
        reducedMIMO-LayersFR2-UL               MIMO-LayersUL
    } OPTIONAL
}
```

The UE 1b-05 may report reconfiguration information preferred to by the UE 1b-05 for overheating prevention to the gNB 1b-10, via the overheatingAssistance IE.

In the IE above, reducedMaxCCs indicates the maximum number of secondary cells (SCells) preferred by the UE 1b-05. Information about the maximum number of Scells preferred by the UE 1b-05 is indicated for each UL and DL.

reducedMaxBW-FR1 and reducedMaxBW-FR2 indicate maximum frequency bandwidths preferred by the UE 1b-05 in a frequency range 1 (FR1) and a frequency range 2 (FR2) respectively. Information about the maximum frequency bandwidths preferred by the UE 1b-05 is indicated for each UL and DL. FR is a frequency range defined in the NR standard, and FR1 denotes a low frequency range and FR2 denotes a high frequency range based on a certain frequency. ReducedMaxBW-FR2 may indicate 0 MHz, and the indication of 0 MHz denotes that FR2 release is requested. ReducedMaxBW-FR1 is unable to indicate 0 MHz. Alternatively, reducedMaxBW-FR1 may indicate 0 MHz.

reducedMaxMIMO-LayersFR1 and reducedMaxMIMO-LayersFR2 indicate the maximum number of MIMO layers preferred by the UE 1b-05 in FR1 and FR2, respectively. Information about the maximum number of MIMO layers preferred by the UE 1b-05 is indicated for each UL and DL.

Upon receiving the overheatingAssistance IE, in step 1b-40, the gNB 1b-10 performs reconfiguration based on the reconfiguration information proposed by the UE 1b-05. Here, actual reconfiguration and a reconfigured parameter configuration value may be determined according to implementation of the gNB 1b-10.

Information about the reconfiguration performed by the gNB 1b-10 is provided to the UE 1b-05 in step 1b-45 via RRCReconfiguration that is one RRC message.

In a mobile communication environment, heat generation and power consumption of a terminal may be associated with each other. For example, when a terminal performs high speed data transmission, power consumption of the terminal may increase and heat generation may occur at the same time. Accordingly, information of the overheatingAssistance IE for mitigating the heat generation, which is reported to the gNB 1b-10 by the UE 1b-05, may also reduce power consumption of the UE 1b-05.

Herein, a method is provided for using an overheatingAssistance IE to reduce power consumption of a terminal. For example, separate new information is reported to mitigate the power consumption of the terminal, in addition to the overheatingAssistance IE.

Figure 1C:
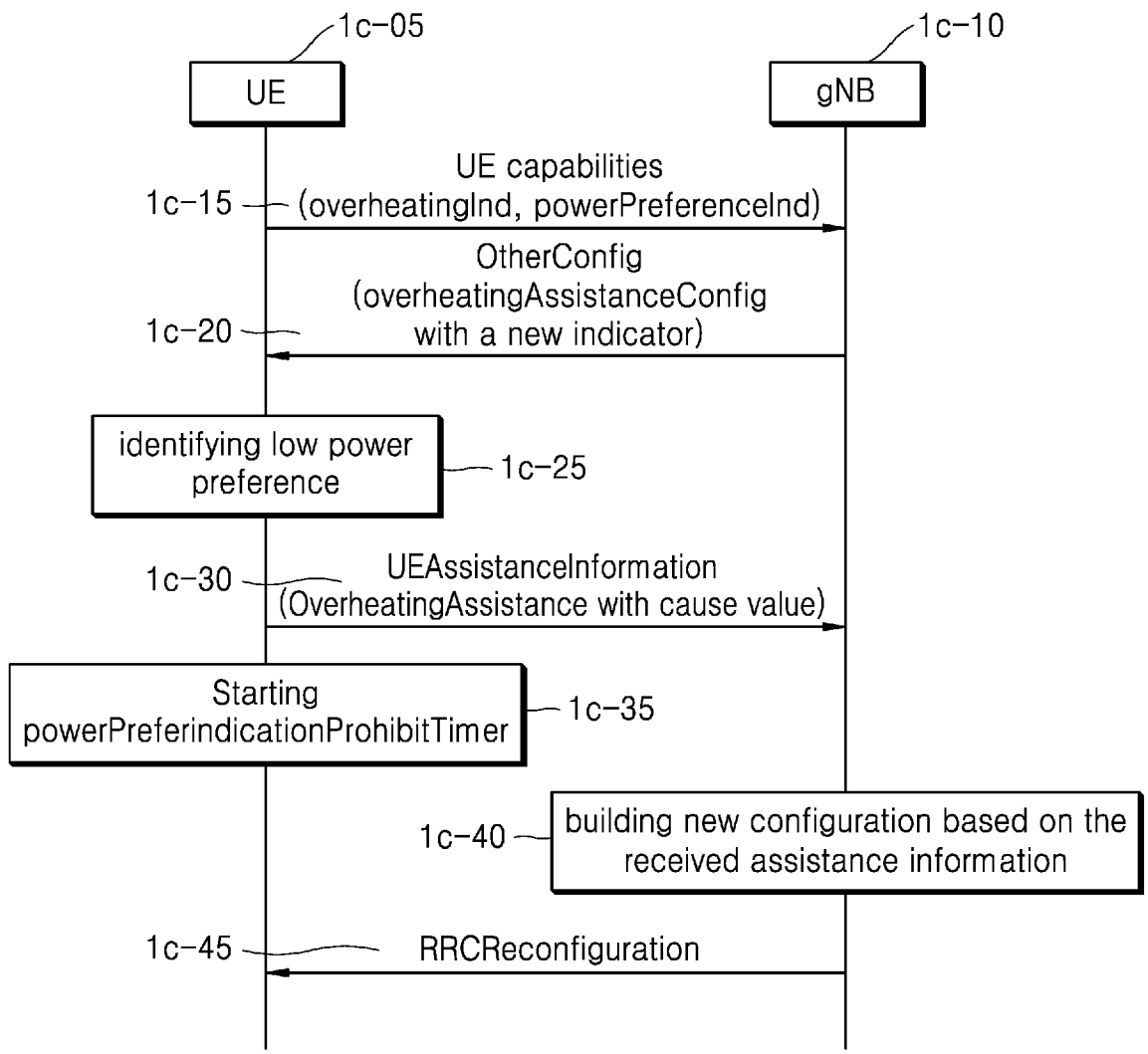
FIG. 1C is a signal flow diagram illustrating a process in which certain information for mitigating overheating of a UE is used to reduce power consumption of the UE, according to an embodiment.

FIG. 1C is a signal flow diagram illustrating a process in which information for mitigating overheating of a UE is used to reduce power consumption of the, according to an embodiment.

Referring to FIG. 1C, in step 1c-15, the UE 1c-05 reports, to a gNB 1c-10, that the UE 1c-05 has a capability to report an overheatingAssistance IE to mitigate heat generation in the UE 1c-05. The UE 1c-05 may additionally report that it has a capability to use the overheatingAssistance IE to reduce power consumption of the UE 1c-05. The UE 1c-05 may report that it has a capability to report information for reducing power consumption of the UE 1c-05.

In step 1c-20, the gNB 1c-10 configures the UE 1c-05 to report information for mitigating heat generation of the UE 1c-05 and information for reducing power consumption of the UE 1c-05, via an overheatingAssistanceConfig IE. The overheatingAssistanceConfig IE may include a first indicator indicating that the overheatingAssistance IE may be used to reduce the power consumption of the UE 1c-05. The overheatingAssistanceConfig IE may include an overheatingIndicationProhibitTimer value as a value of a prohibit timer. The overheatingAssistanceConfig IE may include a powerPreferIndicationProhibitTimer value as a separate value of the prohibit timer applied when the overheatingAssistance IE is used to reduce the power consumption of the UE 1c-05. That is, the overheatingAssistanceConfig IE may include the overheatingIndicationProhibitTimer value and/or the powerPreferIndicationProhibitTimer value.

When one timer is included in the overheatingAssistanceConfig IE, the UE 1c-05 may replace the value of the prohibit timer included in the overheatingAssistanceConfig IE with a timer of another purpose.

In step 1c-35, the prohibit timer may be started when the UE 1c-05 identifies that the power consumption needs to be reduced in step 1c-25 and reports the information to reduce the power consumption in step 1c-30.

While the prohibit timer is running, the UE 1c-05 is unable to report the information for reducing the power consumption again to the gNB 1c-10. Accordingly, excessive occurrence of signaling overhead caused by frequent triggering of reporting may be prevented. The information for mitigating the heat generation and the information for reducing the power consumption may be included in the overheatingAssistance IE and are transmitted to the gNB 1c-10 via a UEAssistanceInformation message that is one RRC message.

The UE 1c-05 may report reconfiguration information for power consumption reduction preferred by the UE 1c-05, to the gNB 1b-10, via the overheatingAssistance IE. Because the overheatingAssistance IE may be used for two purposes, i.e., heat generation suppression and power consumption saving, an indicator (cause value) indicating a purpose of a triggered IE may be included in the IE. For example, the indicator (cause value) may indicate the heat generation suppression, power consumption saving, or a combination thereof.

A bitmap of two bits may be used as the indicator (cause value). For example, in the bitmap of two bits, a first bit may be related to the heat generation suppression and when a value of the first bit is 1, the overheatingAssistance IE may be a message for mitigating the heat generation. In the bitmap of two bits, a second bit may be related to the power consumption saving and when a value of the second bit is 1, the overheatingAssistance IE may be a message for saving the power consumption. However, a method of implementing the indicator (cause value) is not limited thereto and may vary. For example, when 1 bit is used for the indicator (cause value), a bit value of 0 may indicate that the overheatingAssistance IE is a message for mitigating the heat generation and a bit value of 1 may indicate that the overheatingAssistance IE is a message for conversing the power consumption.

A prohibit timer that is running may vary depending on whether the message is for heat generation suppression or the power consumption saving. For example, when the overheatingAssistance IE is for the heat generation suppression, a prohibit timer having the overheatingIndicationProhibitTimer value may be used, and when the overheatingAssistance IE is for the power consumption saving, a prohibit timer having the powerPreferIndicationProhibitTimer value may be used. When the overheatingAssistance IE is for the heat generation suppression and the power consumption saving, one timer may be running according to a predefined rule. For example, a timer with a short value from among two timers may be running or a timer with a long value from among the two timers may be driven. Also, one of the prohibit timer having the overheatingIndicationProhibitTimer value or the prohibit timer having the powerPreferIndicationProhibitTimer value may be always running.

Upon receiving the overheatingAssistance IE, in step 1c-40, the gNB 1c-10 performs reconfiguration based on the reconfiguration information proposed by the UE 1c-05. Here, actual reconfiguration and a reconfigured parameter configuration value may be determined according to implementation of the gNB 1c-10.

In step 1c-45, information about the reconfiguration performed by the gNB 1c-10 is provided to the UE 1c-05 via RRCReconfiguration that is one RRC message.

Figure 1D:
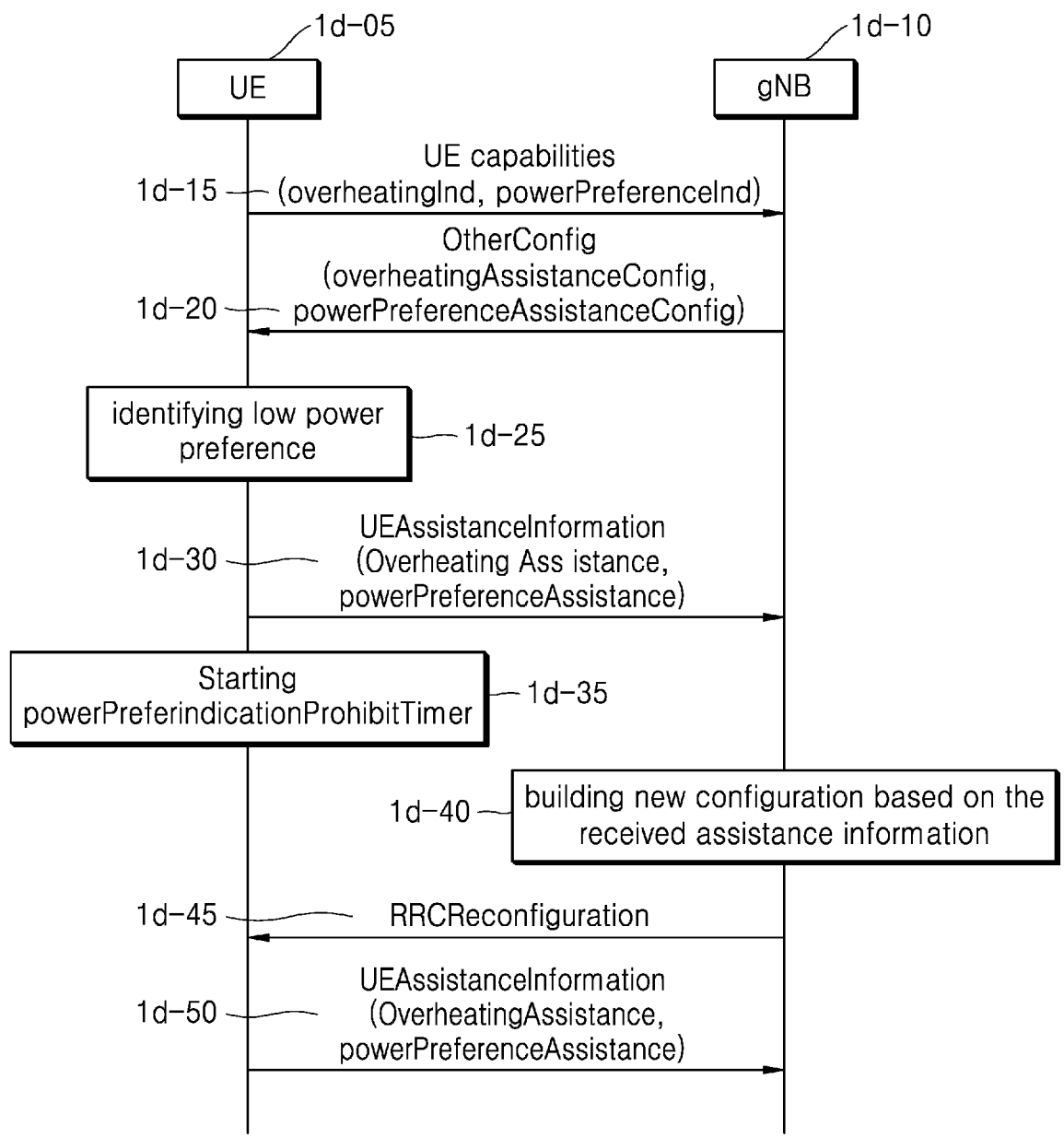
FIG. 1D is a signal flow diagram illustrating a process in which a UE reports certain information to a gNB to save power consumption of the UE, according to an embodiment.
Figure 1E:
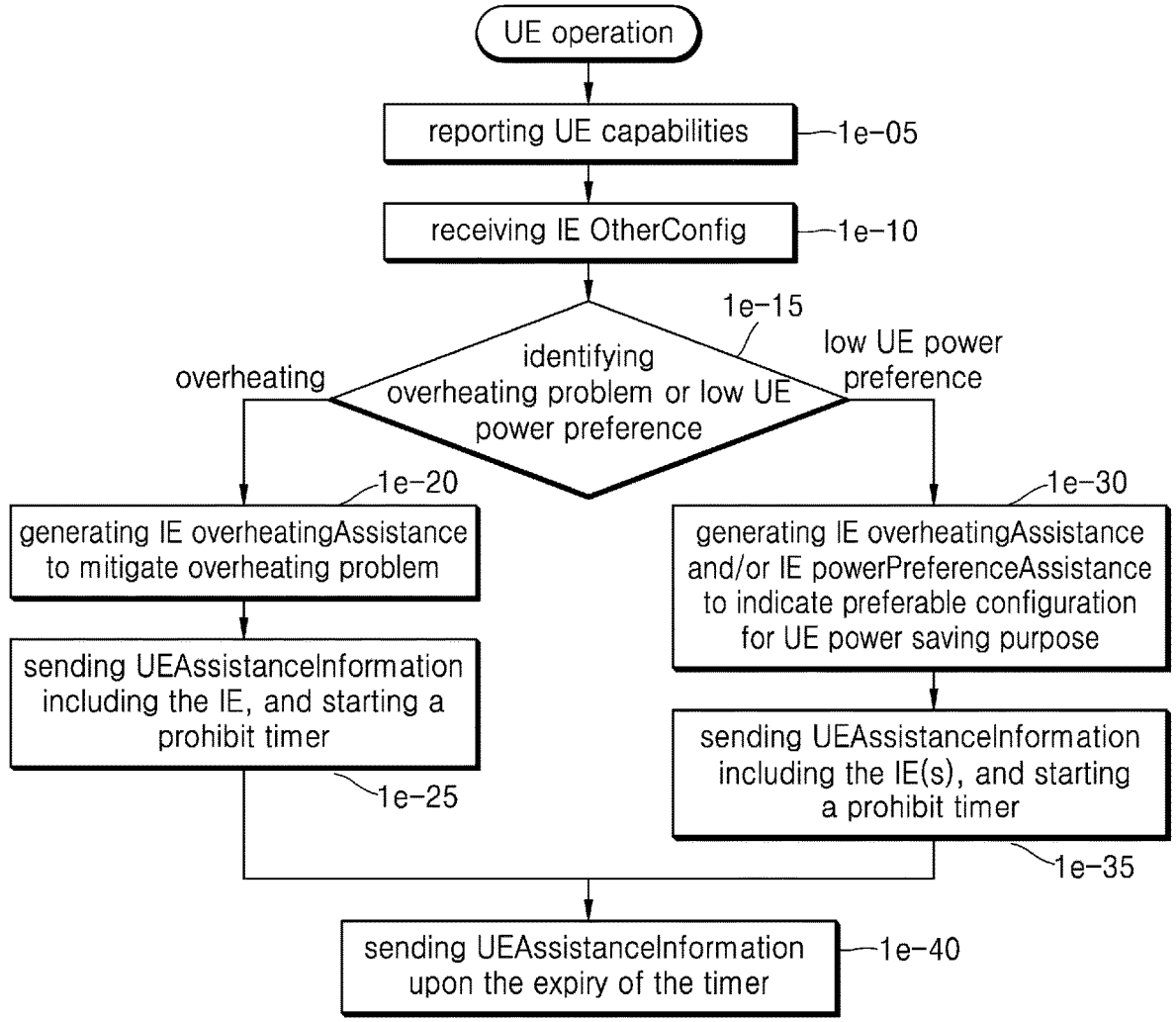
FIG. 1E is a flowchart illustrating operations of a UE, according to an embodiment.

FIG. 1D is a signal flow diagram illustrating a process in which a UE reports information to a gNB to save power consumption of the UE, according to an embodiment.

Referring to FIG. 1D, in step 1d-15, a UE 1d-05 reports, to a gNB 1d-10, that the UE 1d-05 has at least one capability from among a capability to use an overheatingAssistance IE to reduce power consumption of the UE 1d-05 and a capability to report new information for reducing power consumption of the UE 1d-05.

In step 1d-20, the gNB 1d-10 configures the UE 1d-05 to report information to the gNB 1d-10 via at least one of two IEs. A first IE is an overheatingAssistanceConfig IE that may include a first indicator indicating that the overheatingAssistance IE may be used to reduce the power consumption of the UE 1d-05. The overheatingAssistanceConfig IE may include an overheatingIndicationProhibitTimer value as a value of a prohibit timer. A second IE is a powerPreferenceAssistanceConfig IE that may indicate that information (e.g., powerPreferenceAssistance IE), such as power PreflIndication (PPI), is reportable. The powerPreferenceAssistanceConfig IE may include a powerPreferIndicationProhibitTimer value as a value of a prohibit timer.

When the UE 1d-05 transmits, to the gNB 1d-10, a message indicating that both the overheatingAssistance IE and the powerPreferenceAssistanceConfig IE are possible but only a message including the second IE is transmitted to the UE 1d-05, the UE 1d-05 may transmit an overheatingAssistance message based on configuration information included in the second IE.

When the UE 1d-05 transmits, to the gNB 1d-10, a message indicating that both the overheatingAssistance IE and the powerPreferenceAssistanceConfig IE are possible but only a message including the first IE is transmitted to the UE 1d-05, the UE 1d-05 may transmit a powerPreferenceAssistance message based on configuration information included in the first IE.

When the UE 1d-05 transmits, to the gNB 1d-10, a message indicating that the powerPreferenceAssistanceConfig IE is possible but only the message including the first IE is transmitted to the UE 1d-05, the UE 1d-05 may transmit the powerPreferenceAssistance message based on the configuration information included in the first IE.

Upon receiving at least one of the two IEs, when the UE 1d-05 identifies low power preference in step 1d-25, the UE 1d-05 reports a UEAssistanceInformation message including at least one of the overheatingAssistance IE or the powerPreferenceAssistance IE, to the gNB 1d-10, in step 1d-30.

The UE 1d-05 may report reconfiguration information preferred by the UE 1d-05 to the gNB 1d-10 for power consumption saving, via the overheatingAssistance IE. Because the overheatingAssistance IE may be used for two purposes, i.e., heat generation suppression and power consumption saving, an indicator (cause value) indicating a purpose of the triggered overheatingAssistance IE may be included in the overheatingAssistance IE. For example, the indicator (cause value) may indicate the heat generation suppression, power consumption saving, or a combination thereof.

The UE 1d-05 may report information, such as PPI, to the gNB 1d-10, via the powerPreferenceAssistance IE. PPI denotes the reconfiguration information preferred by the UE 1d-05 to reduce power consumption of the UE 1d-05. For example, PPI may include one or more bits and the UE 1d-05 may notify the gNB 1d-10 of low power preference via PPI. When PPI includes two or more bits, examples of information indicated by PPI may include the following:

1) Power descaling factor—Includes terminal transmit power reduction rate information preferred by a terminal, e.g., 00:1 dB, 01: 1.5 dB, 10: 2 dB, 11: 3 dB 2) Deactivation UL for specific radio access technology (RAT) indicator—RAT information desired by a terminal under dual connectivity configuration to be deactivated or released. For example, 01: LTE, 10: NR, 11: LTE & NR 3) Deactivation UL for specific component carrier (CC) indicator—UL indication information of a specific CC desired to be deactivated or released when carrier aggregation is configured (e.g., in a form of a bitmap including the number of bits equal to the number of configured CCs), or UL indication information of a specific CC desired to maintain an active state when carrier aggregation is configured (e.g., all CCs are deactivated excluding a specific CC indicated via a form of a bitmap including the number of bits capable of representing the number of configured CCs).

Connected mode-discontinuous reception (C-DRX) configuration information preferred by the UE 1d-05 for power consumption saving may be included in the powerPreferenceAssistance IE. The C-DRX configuration information may include at least one of a long DRX cycle, onDuration value, or a DRX inactivityTimer value preferred by the UE 1d-05.

At least one of parameters included in the overheatingAssistance IE may be included in the powerPreferenceAssistance IE.

A prohibit timer having the overheatingIndicationProhibitTimer value and a prohibit timer having the powerPreferIndicationProhibitTimer value are started in step 1d-35 when the overheatingAssistance IE and the powerPreferenceAssistance IE are reported, respectively, and when each timer expires, the UE 1d-05 reports a corresponding IE again, in step 1d-50.

When the overheatingAssistance IE is for the heat generation suppression, the prohibit timer having the overheatingIndicationProhibitTimer value may be used, and when the overheatingAssistance IE is for the power consumption saving, the prohibit timer having the powerPreferIndicationProhibitTimer value may be used. When the overheatingAssistance IE is for the heat generation suppression and the power consumption saving, one of the prohibit timers may be run according to a predetermined rule. For example, a timer with a short value from among two timers may be running or a timer with a long value from among the two timers may be driven. Alternatively, the prohibit timer having the powerPreferIndicationProhibitTimer value may be always running.

Upon receiving the UEAssistanceInformation message, in step 1d-40, the gNB 1d-10 performs reconfiguration based on the reconfiguration information proposed by the UE 1d-05. Here, actual reconfiguration and a reconfigured parameter configuration value may be determined according to implementation of the gNB 1d-10. Information about the reconfiguration performed by the gNB 1d-10 is provided to the UE 1d-05 in step 1d-45 via RRCReconfiguration that is one RRC message.

When a corresponding prohibit timer is not running and power consumption preference of the UE 1d-05 is changed, the UE 1d-05 reports at least one of the overheatingAssistance IE or the powerPreferenceAssistance IE again in step 1d-50. When the UE 1d-05 is no longer required to save power consumption, the UE 1d-05 may report, to the gNB 1d-10, the UEAssistanceInformation message without including the overheatingAssistance IE or the powerPreferenceAssistance IE.

FIG. IE is a flowchart illustrating operations of a UE, according to an embodiment.

Referring to FIG. IE, in step 1e-05, the UE reports its capability information to a BS. The capability information may include at least one of an indicator indicating whether the UE supports overheatingAssistance IE reporting, an indicator indicating whether the overheatingAssistance IE is reportable for power consumption saving, or an indicator whether the UE supports powerPreferenceAssistance IE reporting.

In step 1e-10, the UE receives an otherConfig IE included in an RRCReconfiguration message transmitted from the BS. The otherConfig IE may include at least one of an overheatingAssistanceConfig IE or a powerPreferenceAssistanceConfig IE. The overheatingAssistanceConfig IE may be used to configure that reconfiguration information (the overheatingAssistance IE) preferred by the UE is reported when overheating of the UE occurs. When the overheatingAssistance IE is allowed to be reported for power consumption saving, the overheatingAssistanceConfig IE may include a first indicator indicating reporting for the power consumption saving. The powerPreferenceAssistanceConfig IE may be used to configure that reconfiguration information (the powerPreferenceAssistance IE) preferred by the UE is reported when the power consumption saving is required. The overheatingAssistanceConfig IE and the powerPreferenceAssistanceConfig IE may respectively include an overheatingIndicationProhibitTimer value and a powerPreferIndicationProhibitTimer value.

In step 1e-15, the UE identifies whether overheating occurred, or low power preference occurred. Although not shown, the UE can identify both the overheating and the low power preference occurred.

In step 1e-20, when only the overheating is identified, the UE generates reconfiguration information for mitigating the overheating and include the generated reconfiguration information in the overheatingAssistance IE.

In step 1e-25, the UE transmits a UEAssistanceInformation message including the overheatingAssistance IE and start a prohibit timer having the overheatingIndicationProhibitTimer value.

In step 1e-30, when the low power preference is identified, the UE may generate reconfiguration information for saving power consumption and include the generated reconfiguration information to the overheatingAssistance IE or the powerPreferenceAssistance IE. When the overheatingAssistance IE is reported for power consumption saving, the UE may include a cause value indicating a purpose of the power consumption saving to the overheatingAssistance IE.

In step 1e-35, the UE transmits the UEAssistanceInformation message including the overheatingAssistance IE or the powerPreferenceAssistance IE, and starts a prohibit timer having the overheatingIndicationProhibitTimer value or a powerPreferIndicationProhibitTimer value. For example, the UE may start both the prohibit timer having the overheatingIndicationProhibitTimer value corresponding to the overheatingAssistance IE or the prohibit timer having the powerPreferIndicationProhibitTimer value corresponding to the powerPreferenceAssistance IE, or start one prohibit timer determined according to a certain rule.

In step 1e-40, the UE transmits the UEAssistanceInformation message including the overheatingAssistance IE or the powerPreferenceAssistance IE to the BS again when the prohibit timer started in step 1e-35 expires. For example, when independent prohibit timers are each running and the prohibit timer expires, the UE may report the overheatingAssistance IE or the powerPreferenceAssistance IE corresponding to the expired prohibit timer to the BS again. When one selected prohibit timer is running, the UE may report the overheatingAssistance IE or the powerPreferenceAssistance IE to the BS again when the driven prohibit timer expires.

Figure 1F:
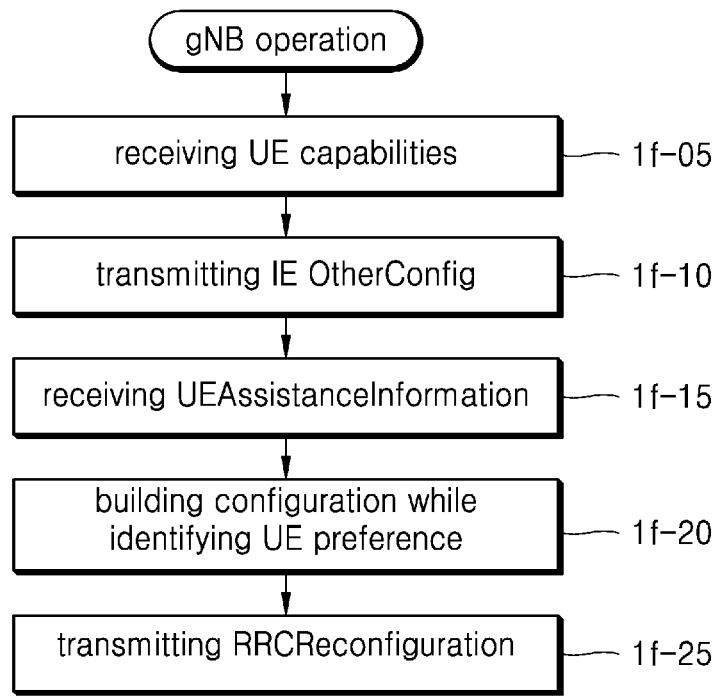
FIG. 1F is a flowchart illustrating operations of a gNB, according to an embodiment.

FIG. 1F is a flowchart illustrating operations of a gNB, according to an embodiment.

Referring to FIG. 1F, in step 1f-05, the gNB receives UE capability information from a UE.

In step 1f-10, the gNB transmits, to the UE, an otherConfig IE including an overheatingAssistanceConfig IE and a powerPreferenceAssistanceConfig IE.

In step 1f-15, the gNB receives a UEAssistanceInformation message from the UE. The UEAssistanceInformation message may include an overheatingAssistance IE or a powerPreferenceAssistance IE.

In step 1f-20, the gNB generates configuration parameters based on information received from the UE.

In step 1f-25, the gNB transmits, to the UE, configuration information including the generated configuration parameters by including the configuration information in an RRCReconfiguration message.

Figure 1G:
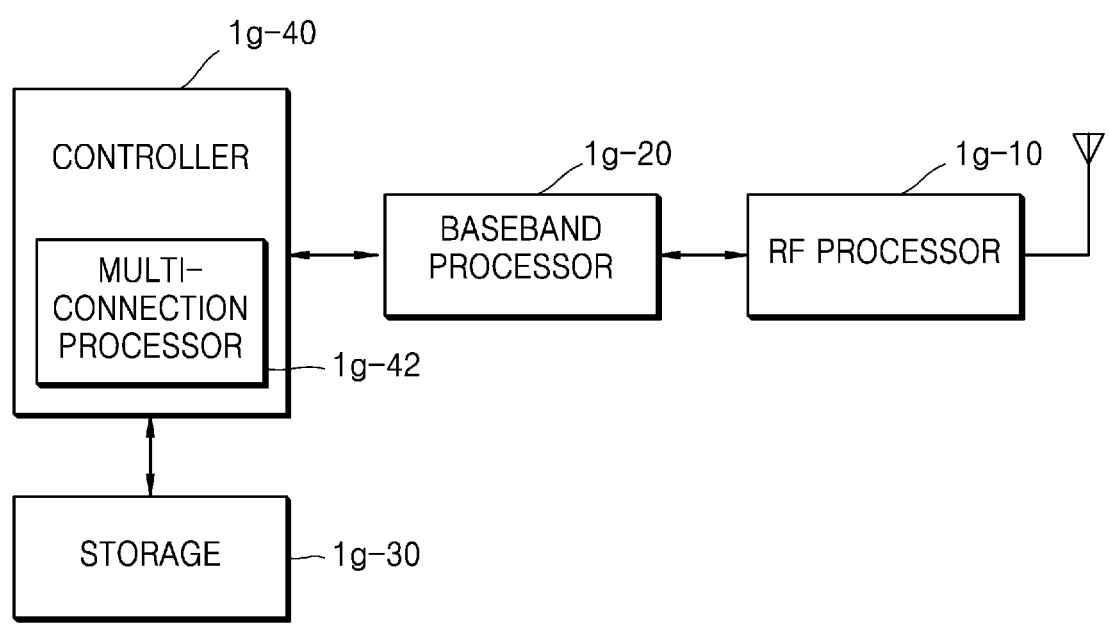
FIG. 1G illustrates an internal structure of a terminal, according to an embodiment.

FIG. 1G illustrates an internal structure of a terminal, according to an embodiment.

Referring to FIG. 1G, the terminal includes a radio frequency (RF) processor 1g-10, a baseband processor 1g-20, a storage 1g-30, and a controller 1g-40. However, the internal structure of the terminal is not limited thereto and may include more or fewer components than those illustrated in FIG. 1G.

The RF processor 1g-10 may perform functions for transmitting and receiving signals through radio channels, e.g., signal band conversion and amplification. That is, the RF processor 1g-10 up-converts a baseband signal provided from the baseband processor 1g-20, to an RF band signal and transmit the RF band signal through an antenna, and down-converts an RF band signal received through an antenna, to a baseband signal. The RF processor 1g-10 may include a transmit filter, a receive filter, an amplifier, a mixer, an oscillator, a digital-to-analog converter (DAC), and an analog-to-digital converter (ADC).

Although only a single antenna is illustrated in FIG. 1G, the terminal may include multiple antennas. The RF processor 1g-10 may include a plurality of RF chains. The RF processor 1g-10 may perform beamforming. For beamforming, the RF processor 1g-10 may adjust phases and amplitudes of signals transmitted or received through multiple antennas or antenna elements. The RF processor 1g-10 may perform MIMO and may receive data of multiple layers in the MIMO operation. The RF processor 1g-10 may perform received beam sweeping by appropriately configuring multiple antennas or antenna elements, or adjust a direction and a beam width of the received beam to coordinate with a transmit beam, under the control of the controller 1g-40.

The baseband processor 1g-20 may convert between a baseband signal and a bitstream based on physical layer specifications of a system. For data transmission, the baseband processor 1g-20 generates complex symbols by encoding and modulating a transmit bitstream. For data reception, the baseband processor 1g-20 reconstructs a received bitstream by demodulating and decoding a baseband signal provided from the RF processor 1g-10. According to an OFDM scheme, for data transmission, the baseband processor 1g-20 generates complex symbols by encoding and modulating a transmit bitstream, maps the complex symbols to subcarriers, and then configures OFDM symbols by performing inverse fast Fourier transform (IFFT) computation and cyclic prefix (CP) insertion. For data reception, the baseband processor 1g-20 may split a baseband signal in OFDM symbol units, the baseband signal being provided from the RF processor 1g-10, reconstruct signals mapped to subcarriers by performing fast Fourier transform (FFT) computation, and then reconstruct a received bitstream by demodulating and decoding the signals.

The baseband processor 1g-20 and the RF processor 1g-10 transmit and receive signals as described above. As such, each of the baseband processor 1g-20 and the RF processor 1g-10 may also be called a transmitter, a receiver, a transceiver, or a communicator. At least one of the baseband processor 1g-20 or the RF processor 1g-10 may include multiple communication modules to support multiple different radio access technologies. At least one of the baseband processor 1g-20 or the RF processor 1g-10 may include multiple communication modules to process signals of different frequency bands. The different radio access technologies may include an LTE network, NR network, etc. The different frequency bands may include a super high frequency (SHF) (e.g., 2.5 GHz and 5 GHz) band and a mmWave (e.g., 60 GHz) band. The terminal may transmit or receive a signal to or from a BS by using the baseband processor 1g-20 and the RF processor 1g-10, and the signal may include control information and data.

The storage 1g-30 may store data for operation of the terminal, e.g., basic programs, application programs, and configuration information. The storage 1g-30 may provide the stored data upon request by the controller 1g-40. The storage 1g-30 may be configured in a storage medium, such as read-only memory (ROM), random access memory (RAM), a hard disk, compact disc-ROM (CD-ROM), or digital versatile disc (DVD), or a combination thereof. The storage 1g-30 may be configured in a plurality of memories.

The controller 1g-40 may control overall operations of the terminal. For example, the controller 1g-40 may transmit and receive signals through the baseband processor 1g-20 and the RF processor 1g-10. The controller 1g-40 may record and read data on and from the storage 1g-30. In this regard, the controller 1g-40 may include at least one processor. For example, the controller 1g-40 may include a communication processor for controlling communications and an application processor (AP) for controlling an upper layer such as an application program. The controller 1g-40 may include a multi-connection processor 1g-42 configured to process in a multi-connection mode. At least one component in the terminal may be embodied in one chip. The controller 1g-40 may control the terminal to perform a method of performing a procedure of reconfiguring the terminal based on a state of the terminal described above. At least one component in the terminal may be embodied in one chip.

Figure 1H:
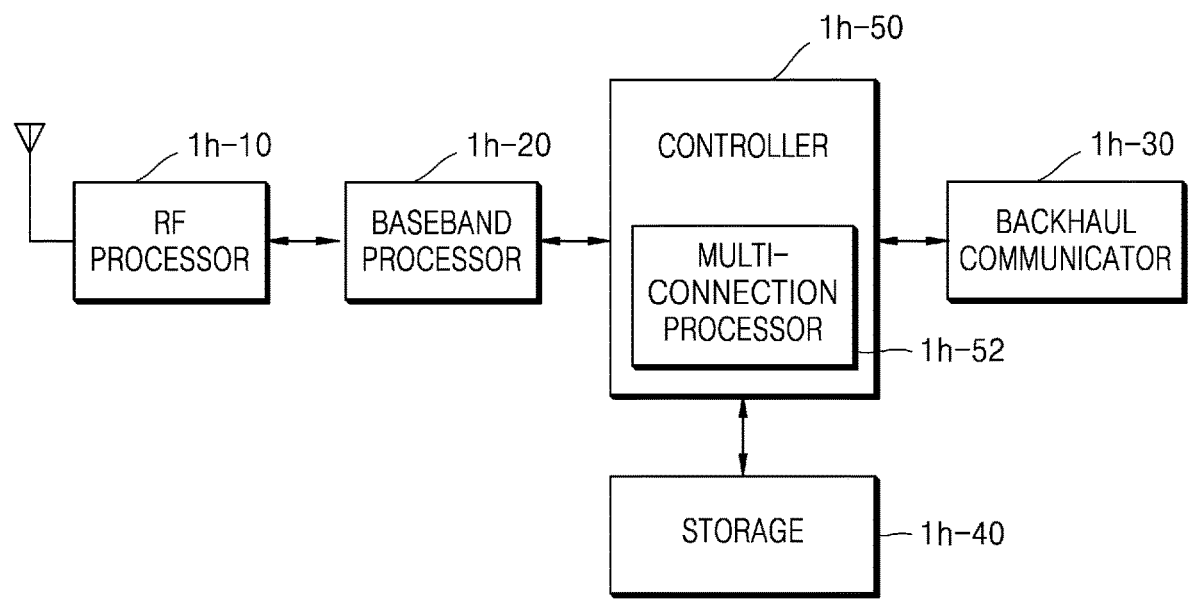
FIG. 1H illustrates a BS, according to an embodiment.

FIG. 1H illustrates a BS, according to an embodiment.

Referring to FIG. 1H, the BS (or a transmission reception point (TRP) or a wireless node) includes an RF processor 1h-10, a baseband processor 1h-20, a backhaul communicator 1h-30, a storage 1h-40, and a controller 1h-50. However, the configuration of the BS is not limited thereto and may include more or fewer components than those shown in FIG. 1H.

The RF processor 1h-10 may perform functions for transmitting and receiving signals through radio channels, e.g., signal band conversion and amplification. That is, the RF processor 1h-10 up-converts a baseband signal provided from the baseband processor 1h-20, to an RF band signal and transmit the RF band signal through an antenna, and down-converts an RF band signal received through an antenna, to a baseband signal. The RF processor 1h-10 may include a transmit filter, a receive filter, an amplifier, a mixer, an oscillator, a DAC, and an ADC.

Although only a single antenna is illustrated in FIG. 1H, the BS may include multiple antennas. The RF processor 1h-10 may include a plurality of RF chains. In addition, the RF processor 1h-10 may perform beamforming. For beamforming, the RF processor 1h-10 may adjust phases and amplitudes of signals transmitted or received through multiple antennas or antenna elements. The RF processor 1h-10 may perform DL MIMO by transmitting data of two or more layers.

The baseband processor 1h-20 may convert between a baseband signal and a bitstream based on physical layer specifications of a first radio access technology. For data transmission, the baseband processor 1h-20 generates complex symbols by encoding and modulating a transmit bitstream. For data reception, the baseband processor 1h-20 reconstructs a received bitstream by demodulating and decoding a baseband signal provided from the RF processor 1h-10. According to an OFDM scheme, for data transmission, the baseband processor 1h-20 generates complex symbols by encoding and modulating a transmit bitstream, maps the complex symbols to subcarriers, and then configures OFDM symbols by performing IFFT computation and CP insertion. For data reception, the baseband processor 1h-20 may split a baseband signal provided from the RF processor 1h-10, in OFDM symbol units, reconstruct signals mapped to subcarriers by performing FFT computation, and then reconstruct a received bitstream by demodulating and decoding the signals. The baseband processor 1h-20 and the RF processor 1h-10 transmit and receive signals as described above. As such, each of the baseband processor 1h-20 and the RF processor 1h-10 may also be called a transmitter, a receiver, a transceiver, a communicator, or a wireless communicator. The BS may transmit or receive a signal to or from a terminal by using the baseband processor 1h-20 and the RF processor 1h-10, and the signal may include control information and data.

The backhaul communicator 1h-30 may provide an interface for communicating with other nodes in a network. The backhaul communicator 1h-30 may convert a bit string transmitted from the BS to another node, e.g., an auxiliary BS or a core network, into a physical signal, and convert a physical signal received from the other node into a bit string.

The storage 1h-40 may store data for operation of the BS described above, e.g., basic programs, application programs, and configuration information. In particular, the storage 1h-40 may store information about bearers allocated for a connected terminal, a measurement report transmitted from the connected terminal, etc. The storage 1h-40 may store criteria information used to determine whether to provide or release multi-connection to or from the terminal. The storage 1h-40 may provide the stored data upon request by the controller 1h-50. The storage 1h-40 may be configured in a storage medium, such as ROM, RAM, a hard disk, CD-ROM, or DVD, or a combination thereof. The storage 1h-40 may be configured in a plurality of memories.

The controller 1h-50 may control overall operations of the BS. The controller 1h-50 may transmit and receive signals through the baseband processor 1h-20 and the RF processor 1h-10 or through the backhaul communicator 1h-30. The controller 1h-50 may record and read data on and from the storage 1h-40. In this regard, the controller 1h-50 may include at least one processor. The controller 1h-50 may control the BS such that the terminal performs a method of reconfiguring a terminal based on a state of the terminal. At least one component in the BS may be embodied in one chip.

Figure 1I:
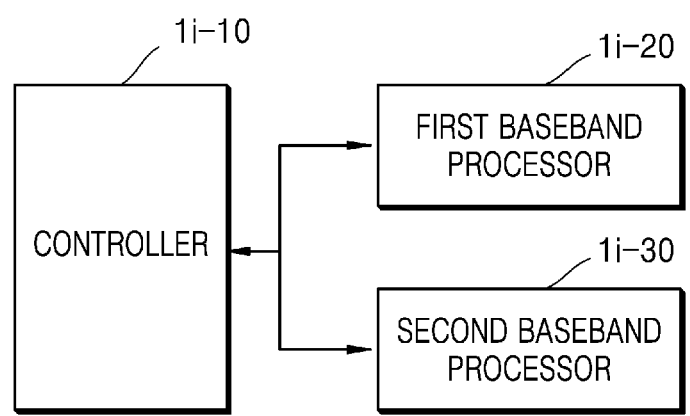
FIG. 1I illustrates a terminal, according to an embodiment.

FIG. 1I illustrates a terminal, according to an embodiment.

Referring to FIG. 1I, the terminal includes a controller 1i-10, a first baseband processor, 1i-20 and a second baseband processor 1i-30. The controller 1i-10 may include an application processor.

The controller 1i-10 may be electrically connected to the first baseband processor 1i-20 and the second baseband processor 1i-30. The controller 1i-10 may transmit or receive data to or from an external terminal by using the first baseband processor 1i-20 and the second baseband processor 1i-30. The controller 1i-10 may control various applications installed in the terminal, by using the transmitted or received data.

The first baseband processor 1i-20 and the second baseband processor 1i-30 may be embodied in a single chip or a single package. The controller 1i-10, the first baseband processor 1i-20, and the second baseband processor 1i-30 may be embodied in a single chip or a single package.

The first baseband processor 1i-20 may perform first cellular communication with a first node (e.g., a gNB). The first baseband processor 1i-20 may perform the first cellular communication to transmit or receive a control message and data to or from the gNB. The first cellular communication may denote one of various cellular communication methods supportable by the terminal. For example, the first cellular communication may denote one of 4G mobile communication methods (e.g., LTE, LTE-A, LTE-A pro) or 5G mobile communication methods. The gNB may denote a BS supporting the first cellular communication.

The second baseband processor 1i-30 may perform second cellular communication with a second node (e.g., an eNB). The second baseband processor 1i-30 may perform the second cellular communication to transmit or receive data to or from the eNB. The second cellular communication may denote one of various cellular communication methods supportable by the terminal. For example, the second cellular communication may denote one of 4G mobile communication methods (e.g., LTE, LTE-A, LTE-A pro) or 5G mobile communication methods. That eNB may denote a BS supporting the second cellular communication.

The first cellular communication may denote a 4G mobile communication method and the second cellular communication may denote an E-UTRA-NR dual connectivity (EN-DC) environment that is a 5G mobile communication method. The first cellular communication may denote a 5G mobile communication method and the second cellular communication may denote an NR-E-UTRA dual connectivity (NE-DC) environment that is a 4G mobile communication method. The first cellular communication and the second cellular communication may both be 5G mobile communication methods exemplifying environments supporting different frequency bands. The controller 1i-10 may control the first baseband processor 1i-20 and a second baseband processor 1i-30 to transmit or receive data by using the first cellular communication or the second cellular communication.

The terminal may use both the first cellular communication and the second cellular communication. The terminal may transmit or receive data for connection of the second cellular communication to or from the BS by using the first cellular communication. The data for connection of the second cellular communication may include a radio resource control message. Connection establishment of the second cellular communication and transmission/reception of data via the second cellular communication may have higher power consumption than transmission/reception of data only via the first cellular communication.

When the terminal uses the second cellular communication, a temperature of the terminal may increase due to the use of the second cellular communication. When the temperature of the terminal increases, various components included in the terminal may be damaged, and a threshold voltage for operating the various components may increase, thereby requiring higher power consumption.

A heat generation suppression state may denote a state in which the various components (e.g., the first baseband processor 1*i*-20 or the second baseband processor 1*i*-30) of the terminal perform various operations to reduce the temperature of the terminal. The heat generation suppression state may include an operation in which a heating state of the terminal is notified to the BS via the first baseband processor 1*i*-20 or the second baseband processor 1*i*-30. The controller 1*i*-10 may verify context information of the terminal and identify whether to enter a power consumption reduction state based on the context information. The context information may include various types of information used to identify whether to enter the power consumption reduction state, and for example, may include various information collected by the terminal and a user input.

Information used to verify the heating state of the terminal may include information related to a temperature collected by at least one temperature measuring sensor included in the terminal. The temperature measured by the temperature measuring sensor may include a temperature of one of the various components included in the terminal. The temperature measuring sensor may measure a temperature of a component affecting the heat generation of the terminal. The temperature measured by the temperature measuring sensor may be a value obtained by measuring and/or calculating a temperature of at least one component included in the terminal. For example, at least one temperature measuring sensor may measure a temperature of the controller 1*i*-10. Alternatively, at least one temperature measuring sensor may measure a temperature of the first baseband processor 1*i*-20 and/or the second baseband processor 1*i*-30. The temperature measuring sensor and a temperature measuring method will be described in more detail below with reference to FIG. 1J.

The controller 1*i*-10 may identify whether to enter the power consumption reduction state based on the context information. The controller 1*i*-10 may generate a signal indicating whether to enter the power consumption reduction state when it is identified to enter the power consumption reduction state. The controller 1*i*-10 may transmit the signal indicating whether to enter the power consumption reduction state to at least one of the first baseband processor 1*i*-20 or the second baseband processor 1*i*-30.

A signal indicating whether to enter at least one of the heat generation suppression state or the power consumption reduction state may be transmitted via a signal path connected between the controller 1*i*-10 and the second baseband processor 1*i*-30. A signal indicating whether to enter at least one of the heat generation suppression state or the power consumption reduction state may be transmitted via a signal path connected between the controller 1*i*-10 and the first baseband processor 1*i*-20. A signal path may include at least one of a high speed (HS)-universal asynchronous receiver-transmitter (UART), peripheral component interconnect (PCI) express (PCIe), inter chip communication, or intra chip communication. The signal indicating whether to enter at least one of the heat generation suppression state or the power consumption reduction state may be embodied in a form of interprocess communication (IPC). The signal indicating whether to enter at least one of the heat generation suppression state or the power consumption reduction state may include two bits. A first bit of the signal may have 1 (true) that is a type indicating entrance to the heat generation suppression state or 0 (false) that is a type indicating entrance to a general state instead of the heat generation suppression state. A second bit of the signal may have 1 (true) that is a type indicating entrance to the power consumption reduction state or 0 (false) that is a type indicating entrance to a general state instead of the power consumption reduction state.

The signal indicating whether to enter at least one of the heat generation suppression state or the power consumption reduction state may be generated and transmitted every pre-set periods. The pre-set period may be set considering a time required by the first baseband processor 1*i*-20 or the second baseband processor 1*i*-30 for a state change, for a smooth state change of the first baseband processor 1*i*-20 or the second baseband processor 1*i*-30.

The second baseband processor 1*i*-30 may receive the signal indicating whether to enter the power consumption reduction state transmitted from the controller 1*i*-10 and identify whether to enter the power consumption reduction state based on the received signal. Upon receiving a signal indicating to enter the power consumption reduction state, the second baseband processor 1*i*-30 may determine to enter the power consumption reduction state.

The first baseband processor 1*i*-20 may receive the signal indicating whether to enter the power consumption reduction state transmitted from the controller 1*i*-10 and identify whether to enter the power consumption reduction state based on the received signal. Upon receiving the signal indicating to enter the power consumption reduction state, the first baseband processor 1*i*-20 may determine that the second baseband processor 1*i*-30 is to enter the power consumption reduction state.

The second baseband processor 1*i*-30 may receive the signal indicating whether to enter the heat generation suppression state transmitted from the controller 1*i*-10 and identify whether to enter the heat generation suppression state based on the received signal. Upon receiving a signal indicating to enter the heat generation suppression state, the second baseband processor 1*i*-30 may determine to enter the heat generation suppression state.

The first baseband processor 1*i*-20 may receive the signal indicating whether to enter the heat generation suppression state transmitted from the controller 1*i*-10 and identify whether to enter the heat generation suppression state based on the received signal. Upon receiving the signal indicating to enter the heat generation suppression state, the first baseband processor 1*i*-20 may determine that the second baseband processor 1*i*-30 is to enter the heat generation suppression state.

Figure 1J:
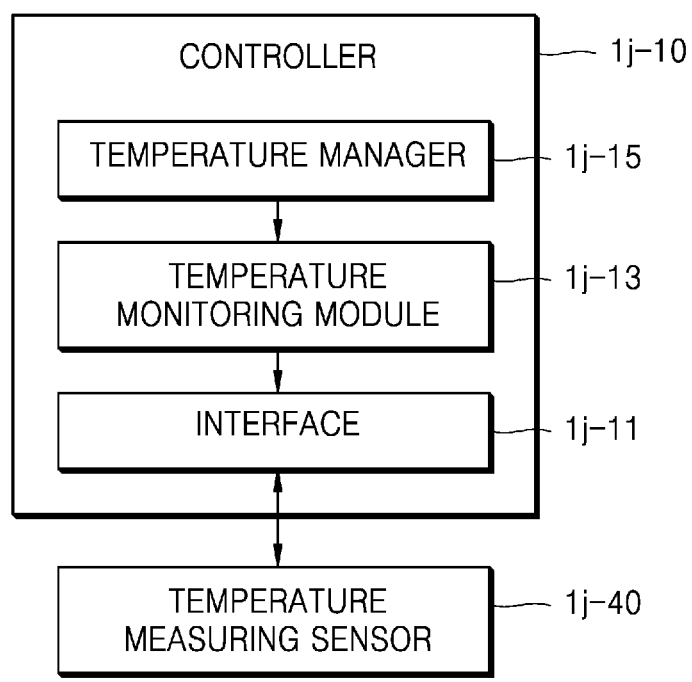
FIG. 1J illustrates a terminal for measuring a temperature and entering a heat generation suppression state, according to an embodiment.

FIG. 1J illustrates a terminal for measuring a temperature and entering a heat generation suppression state, according to an embodiment.

Referring to FIG. 1J, the terminal includes a temperature measuring sensor 1*j*-40 and a controller 1*j*-10, which includes an interface 1*j*-11, a temperature monitoring module 1*j*-13, and a temperature manager 1*j*-15. Alternatively, the interface 1*j*-11, the temperature monitoring module 1*j*-13, and the temperature manager 1*j*-15 may be embodied in the controller 1*j*-10, the first baseband processor 1*i*-20, the second baseband processor 1*i*-30, or a separate circuit module.

The temperature measuring sensor 1*j*-40 may be connected to at least one component included in the terminal. For example, the temperature measuring sensor 1*j*-40 may be connected to at least one component from among the controller 1*j*-10, the first baseband processor 1*i*-20, or the second baseband processor 1*i*-30. The temperature measuring sensor 1*j*-40 may be provided on a circuit board where at least one component of the terminal is implemented. The temperature measuring sensor 1j-40 may be operatively connected to the temperature monitoring module 1j-13 via the interface 1j-11.

The temperature monitoring module 1j-13 may determine a representative temperature of the terminal based on a temperature of at least one component measured by the temperature measuring sensor 1j-40, and transmit the determined representative temperature to the temperature manager 1j-15.

The temperature monitoring module 1j-13 may determine a value of the representative temperature based on the temperature of at least one component included in the terminal. The representative temperature of the terminal may be one of a temperature of one component from among the at least one component of the terminal and a surface temperature of a housing of the terminal determined based on the temperature of at least one component.

The temperature monitoring module 1j-13 may transmit an interrupt signal to the temperature measuring sensor 1j-40 to control the temperature measuring sensor 1j-40 to measure a temperature. The interrupt signal may be generated at every pre-set time.

The temperature monitoring module 1j-13 may determine the surface temperature of the housing of the terminal based on the temperature of at least one component of the terminal. The temperature monitoring module 1j-13 may determine the surface temperature based on a weight value set for each component of the terminal. The weight value may be pre-set by a manufacturer of the terminal.

The temperature monitoring module 1j-13 may change a weight value corresponding to a component of the terminal, which largely affects remaining power consumption of the terminal, to be higher than a weight value corresponding to other components.

When a setting for the value of the representative temperature is changed, the temperature monitoring module 1j-13 may revise the value of the representative temperature to prevent a rapid change in the value of the representative temperature. When the weight value is changed while there is a difference between temperatures of the components of the terminal, the value of the representative temperature may rapidly change. For example, the temperature monitoring module 1j-13 may set an average value of the values of the representative temperature before and after a change as the value of the representative temperature. Alternatively, the temperature monitoring module 1j-13 may set an intermediate value of a calibration graph generated based on the values of the representative temperature before and after a change as the value of the representative temperature.

The temperature manager 1j-15 may determine an operation of the terminal based on the value of the representative temperature transmitted by the temperature monitoring module 1j-13 and policy data.

The temperature manager 1j-15 may identify the value of the representative temperature and refer to the policy data to perform an operation corresponding to the value of the representative temperature. For example, the operation corresponding to the value of the representative temperature may include an operation of entering a heat generation suppression state.

The methods of the disclosure described in the claims or above may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in a device. The one or more programs include instructions to execute the methods according to the embodiments of the disclosure described in the claims or the detailed description.

The programs (e.g., software modules or software) may be stored in RAM, non-volatile memory including flash memory, ROM, electrically erasable programmable ROM (EEPROM), a magnetic disc storage device, a CD-ROM, a DVD, another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device that is accessible through a communication network such as the Internet, an intranet, a local area network (LAN), a wireless LAN (WLAN), a storage area network (SAN), or a combination thereof. The storage device may be connected through an external port to an apparatus according to the embodiments of the disclosure. Another storage device on the communication network may also be connected to the apparatus performing the embodiments of the disclosure.

In a wireless communication system, a terminal may report a reconfiguration request to a BS, based on an overheating state or power saving request state of the terminal, and may be reconfigured according to an instruction of the BS.

In the above-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

The embodiments of the disclosure herein are merely illustrative of specific examples to easily facilitate description and understanding of the disclosure, and are not intended to limit the scope of the disclosure. Accordingly, it will be apparent to one of ordinary skill in the art that other modifications based on the technical ideas of the disclosure are feasible. The embodiments of the disclosure may be combined with each other as required. For example, a portion of one embodiment of the disclosure and a portion of another embodiment of the disclosure may be combined with each other. In addition, modified examples of the embodiments of the disclosure based on the technical ideas of the embodiments of the disclosure may be implemented in other systems, such as LTE systems, 5G or NR communication systems.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method, performed by a terminal, in a wireless communication system, the method comprising:
    transmitting, to a base station (BS), capability information including information associated with a capability supported by the terminal for a power saving preference and information associated with a capability supported by the terminal for overheating of the terminal;

receiving, from the BS, first configuration information for configuring the terminal to report assistance information associated with power saving and overheating, based on the transmitted capability information, the first configuration information including a first prohibit timer information for reporting the assistance information associated with power saving preference, and a second prohibit timer information for reporting the assistance information associated with overheating;

based on the first configuration information, determining first assistance information associated with power saving including at least one of information associated with a component carrier preference, information associated with a bandwidth preference, information associated with a multiple input multiple output (MIMO) layer preference, or information associated with a discontinuous reception (DRX) preference; and transmitting, to the BS, the determined assistance information associated with power saving.

2. The method of claim 1, further comprising:
determining second assistance information associated with overheating including at least one of second information associated with the component carrier preference for mitigating overheating, second information associated with the bandwidth preference for mitigating overheating, or second information associated with the MIMO layer preference for mitigating overheating; and transmitting the second assistance information associated with overheating.

3. The method of claim 1, wherein, when the terminal has a preference on both mitigating overheating and power saving, at least one of the information associated with the component carrier preference, the information associated with the bandwidth preference, the information associated with the MIMO layer preference, or the information associated with the DRX preference is transmitted with overheating assistance information including at least one of the second information associated with the component carrier preference for mitigating overheating, the second information associated with the bandwidth preference for mitigating overheating, or the second information associated with the MIMO layer preference for mitigating overheating.

4. The method of claim 1, wherein the information associated with the DRX preference comprises at least one of information on a DRX inactivity timer length for power saving or information on a long DRX cycle length for power saving.

5. The method of claim 1, wherein the first prohibit timer information includes at least one of prohibit timer information for reporting the information associated with the DRX preference, prohibit timer information for reporting the information associated with the bandwidth preference, prohibit timer information for reporting the information associated with the component carrier preference, or prohibit timer information for reporting the information associated with the MIMO layer preference.

6. The method of claim 1, further comprising:
based on the first prohibit timer information for prohibiting another first assistance information of the terminal from being transmitted while the first prohibit timer corresponding to the transmitted first assistance information is running.

7. A terminal for reconfiguration in a wireless communication system, the terminal comprising:
a transceiver; and
a processor coupled with the transceiver and configured to:
transmit, to a base station (BS), capability information including information associated with a capability supported by the terminal for a power saving preference and information associated with a capability supported by the terminal for overheating of the terminal, receive, from the BS, first configuration information for configuring the terminal to report assistance information associated with power saving and overheating, based on the transmitted capability information, the first configuration information including a first prohibit timer information for reporting information associated with power saving preference, and a second prohibit timer information for reporting the assistance information associated with overheating, based on the first configuration information, determine first assistance information associated with power saving including at least one of information associated with a component carrier preference, information associated with a bandwidth preference, information associated with a multiple input multiple output (MIMO) layer preference, or information associated with a discontinuous reception (DRX) preference, and transmit, to the BS, the determined assistance information associated with power saving.

8. The terminal of claim 7, wherein the processor is further configured to:
determine second assistance information associated with overheating including at least one of second information associated with the component carder preference for mitigating overheating, second information associated with the bandwidth preference for mitigating overheating, or second information associated with the MIMO layer preference for mitigating overheating; and transmit the second assistance information associated with overheating.

9. The terminal of claim 7, wherein, when the terminal has a preference on both mitigating overheating and power saving, at least one of the information associated with the component carrier preference, the information associated with the bandwidth preference, the information associated with the MIMO layer preference, or the information associated with the DRX preference is transmitted with overheating assistance information including at least one of the second information associated with the component carrier preference for mitigating overheating, the second information associated with the bandwidth preference for mitigating overheating, or the second information associated with the MIMO layer preference for mitigating overheating.

10. The terminal of claim 7, wherein the information associated with the DRX preference comprises at least one of information on a DRX inactivity timer length for power saving or information on a long DRX cycle length for power saving.

11. The terminal of claim 7, wherein the first prohibit timer information includes at least one of prohibit timer information for reporting the information associated with the DRX preference, prohibit timer information for reporting the information associated with the bandwidth preference, prohibit timer information for reporting the information associated with the component carrier preference, or prohibit timer information for reporting the information associated with the MIMO layer preference.

12. The terminal of claim 7, wherein the processor is further configured to:
control a first prohibit timer to start, based on the first prohibit timer information for prohibiting another first assistance information of the terminal from being transmitted while the first prohibit timer corresponding to the transmitted first assistance information is running.

13. A method, performed by a base station, for reconfiguring a terminal in a wireless communication system, the method comprising:
receiving, from the terminal, capability information including information associated with a capability supported by the terminal for a power saving preference of the terminal and information associated with a capability supported by the terminal for overheating of the terminal;
transmitting, to the terminal, first configuration information for configuring the terminal to report assistance information associated with power saving and overheating, based on the received capability information, the first configuration information including a first prohibit timer information for reporting the assistance information associated with power saving preference, and a second prohibit timer information for reporting the assistance information associated with overheating;
receiving, from the terminal, the assistance information associated with power saving including at least one of information associated with a component carrier preference, information associated with a bandwidth preference, information associated with a multiple input multiple output (MIMO) layer preference, or information associated with a discontinuous reception (DRX) preference;
generating second configuration information, based on the assistance information; and
transmitting, to the terminal, the generated second configuration information.

14. The method of claim 13, wherein, when the terminal has a preference on both mitigating overheating and for power saving, at least one of the information associated with the component carrier preference, the information associated with the bandwidth preference, the information associated with the MIMO layer preference, or the information associated with the DRX preference is transmitted with overheating assistance information including at least one of second information associated with the component carrier preference for mitigating overheating, second information associated with the bandwidth preference for mitigating overheating, or second information associated with the MIMO layer preference for mitigating overheating.

15. The method of claim 13, wherein the information associated with the DRX preference comprises at least one of information on a DRX inactivity timer length for power saving or information on a long DRX cycle length for power saving.

16. The method of claim 13, wherein the first prohibit timer information includes at least one of prohibit timer information for reporting the information associated with the DRX preference, prohibit timer information for reporting the information associated with the bandwidth preference, prohibit timer information for reporting the information associated with the component carrier preference, or prohibit timer information for reporting the information associated with the MIMO layer preference.

17. A base station for reconfiguring a terminal in a wireless communication system, the terminal comprising:
a transceiver; and
a processor coupled with the transceiver and configured to:
receive, from the terminal, capability information including information associated with a capability supported by the terminal for a power saving preference of the terminal and information associated with a capability supported by the terminal for overheating of the terminal,
transmit, to the terminal, first configuration information for configuring the terminal to report assistance information associated with power saving and overheating, based on the received capability information and overheating, the first configuration information including a first prohibit timer information for reporting the assistance information associated with power saving preference, and a second prohibit timer information for reporting the assistance information associated with overheating,
receive, from the terminal, the assistance information associated with power saving including at least one of information associated with a component carrier preference, information associated with a bandwidth preference, information associated with a multiple input multiple output (MIMO) layer preference, or information associated with a discontinuous reception (DRX) preference,
generate second configuration information, based on the assistance information, and
transmit, to the terminal, the generated second configuration information.

* * * * *